US006900061B2

(12) United States Patent
Smirnov et al.

(10) Patent No.: US 6,900,061 B2
(45) Date of Patent: May 31, 2005

(54) MALDI PLATE AND PROCESS FOR MAKING A MALDI PLATE

(75) Inventors: Igor P. Smirnov, Brookline, MA (US); Andrew J. Tomlinson, Wayland, MA (US); Lawrence A. Haff, Westborough, MA (US); Jennifer M. Campbell, Somerville, MA (US); Cheryl E. Murphy, Hudson, NH (US)

(73) Assignees: PerSeptive BioSystems, Inc., Framingham, MA (US); MDS Inc., Toronto (CA)

( * ) Notice: Subject to any disclaimer, the term of this patent is extended or adjusted under 35 U.S.C. 154(b) by 256 days.

(21) Appl. No.: 10/227,088

(22) Filed: Aug. 23, 2002

(65) Prior Publication Data

US 2004/0038423 A1 Feb. 26, 2004

(51) Int. Cl.$^{7}$ .......................... G01N 24/00; H01J 49/00
(52) U.S. Cl. ....................................... 436/173; 250/288
(58) Field of Search ................................. 422/255, 300, 422/311; 427/355; 436/173; 250/288

(56) References Cited

U.S. PATENT DOCUMENTS 4,828,746 A * 5/1989 Clauss et al. ................ 510/520
5,262,074 A * 11/1993 Erickson et al. ............ 508/419
6,287,872 B1 9/2001 Schurenberg et al.
2002/0051738 A1 5/2002 Schurenberg et al.

FOREIGN PATENT DOCUMENTS

JP 04061957 A * 2/1992 ............ B05D/1/04
WO WO 01/79331 A1 10/2001

OTHER PUBLICATIONS

Rädler et al. "Design of Supported Membranes Tethered via Metal–Affinity Ligand–Receptor Pairs", Biophys. J., Dec. 200 v. 79, pp. 3144–3152.*

Laibinis et al. "Self–Assembled Monolayers of n–Alkanethiolates on Copper are Barrier Films That Protect the Metal Against Oxidation by Air", J. Am. Chem. Soc., 1992, v. 114, pp. 9022–9028.*

Chaki et al. "Applications of Self–Assembled Monolayers in Materials Chemistry", Proc. Indian Acad. Sci., Oct.–Dec. 2001, pp. 659–670.*

Xu et al. "Non–Specific, On–Probe Cleanup Methods for MALDI–MS Samples", Mass Spec. Rev., 2003, v. 22, pp. 429–440.*

"Substrate Selection" SRSMALDI, Online! pp. 1–2, XP002262792 Retrieved from the Internet , URL: http://web.archive.org/web/20020212190257/http://www.srsmaldi.com/Maldi/Step/Sub__Sel.html> 'retrieved on Nov. 24, 2003! the whole document.

PCT International Search Report mailed Dec. 10, 2003 for International Application No. PCT/US03/25240.

* cited by examiner

*Primary Examiner*—Yelena G. Gakh
(74) *Attorney, Agent, or Firm*—Andrew T. Karnakis

(57) ABSTRACT

A sample plate for a MALDI process is provided which comprises an electrically conductive substrate having a hydrophobic coating whose thickness and hydrophobic character can be modified by changing the coating substrate and/or the concentration of the substrate. Different coating substances that have provided optimal performance of the sample plate for reproducible deposition and analysis by MALDI-MS and MALDI-MS/MS processes of analyte mixtures include synthetic waxes such as paraffin compositions, lipids, organic acids, silicon-containing compounds, silica polymers and natural waxes. Metal polishes that have been used to clean and regenerate plate surfaces have also provided a sample plate that has optimal performance for reproducible deposition and analysis by MALDI-MS and MALDI-MS/MS processes of analyte mixtures.

19 Claims, 7 Drawing Sheets

MALDI PLATE AND PROCESS FOR MAKING A MALDI PLATE

BACKGROUND OF THE INVENTION

This invention relates to a plate useful in matrix-assisted laser desorption ionization (MALDI) mass spectrometry analysis and to processes for making and using the plate. More particularly, this invention relates to a MALDI plate having a hydrophobic surface and to processes for making and using the plate.

For the analysis of large molecules such as DNA, peptides, proteins and other biomolecules, mass spectrometry with MALDI ionization is a standard method. For the most part, time-of-flight mass spectrometers (TOF-MS) are used for this purpose, but ion cyclotron resonance spectrometers or Fourier transform ion cyclotron resonance (FT-ICR) mass spectrometers as well as high-frequency quadrupole ion trap mass spectrometers, and hybrid quadrupole time of flight mass spectrometers (Q-TOF) are all applicable for these applications. Normally, biomolecules are in an aqueous solution, but is not uncommon for these important building blocks to be dissolved in solutions that contain varying levels of organic solvents (such as acetonitrile), particularly when reversed phase chromatography is used for isolation and fractionation of complex mixtures of these molecules. The large or high molecular weight substances including the biosubstances, and biomolecules mentioned above, the molecules of which are to be analyzed, are often referred to as "analytes".

The terms biomolecules or biosubstances here denote oligonucleotides, peptides and proteins (i.e., the essential building blocks of the living world) including their particular analogs and conjugates, such as glycoproteins or lipoproteins. In preparation for mass analysis, analytes are isolated from a biological source, including biological fluid (e.g., urine, bile or mucus, etc.), tissue, organ, cell line, etc., by various methods known to the artisan. Usually, cell lysis is performed, with soluble and insoluble fractions isolated by centrifugation. Often the soluble protein fraction can be used without further manipulation. However, it may be useful to fractionate such complex mixtures by a variety of methods including specific isolation of a protein family or complex by separation techniques, such as immunoprecipitation, or immunoaffinity chromatography, one or two-dimensional gel electrophoresis, ion exchange chromatography, reversed phase chromatography or a combination of two or more of these techniques. When proteins are isolated they may be analyzed directly, or following digestion with chemical or enzyme reagents (e.g., cyanogen bromide, trypsin, chymotrypsin, lysine endopeptidase, glutamic acid endopeptidase, pepsin or any other suitable protein cleavage reagent). If peptide fragments are produced these may be isolated and fractionated by one skilled in the art. Briefly, various modes of chromatography (such as reversed phase, anion and/or cation exchange, hydrophilic chromatography, hydrophobic chromatography, displacement chromatography, capillary electrophoresis) or combinations of two or more modes can be used to isolate and fractionate complex peptide mixtures. Analytes (mixtures of peptides and/or proteins) and a matrix solution are deposited on a sample plate, usually made of an electrically conductive material (e.g., stainless steel) in preparation for mass analysis using MALDI.

The choice of a matrix substance for MALDI mass spectrometry (MALDI MS) analysis is dependent upon the type of biomolecules analyzed, with more than a hundred different matrix substances having become known in the field over the past several years. The task of the matrix substance is to separate the sample molecules from each other, to bond them to the sample support plate, to transform them into the gas phase during laser bombardment by the formation of a vapor cloud without destroying the biomolecules and finally to ionize the sample molecules by protonation or deprotonation. It has been found advantageous to incorporate analyte molecules in some form into the usually crystalline matrix substances during their crystallization or at least into the boundary surfaces between the small crystals.

Various methods are known for applying the sample and matrix to a sample plate. The simplest of these involves pipetting a droplet of a solution with sample and matrix onto a clean, metal (e.g., stainless steel) sample support plate. This droplet wets an area on the metal surface, the size of which corresponds approximately to the diameter of the droplet and is dependent on the hydrophobic properties of the metal surface and the characteristics of the droplet. After the solution dries, the sample spot consists of small matrix crystals spread over the formerly wet area, whereby generally there is no uniform coating of the previously wetted area. In aqueous solutions, most of the small crystals of the matrix generally begin to grow at the periphery of the wetted area on the metal plate, growing toward the inside of the wetted area.

In high throughput MALDI MS analysis utilizing robotics to transfer and deposit samples at high rates of sample processing, it is important that the sample plates used in the processing have uniform surfaces on a plate by plate basis so as to provide improved reliability of the measured data. For high throughput processing and automated data collection, it is also important that the footprint area of the deposited samples for a fixed volume be uniform, small and predictable. The provision of a hydrophobic surface on a sample plate permits depositing samples having a smaller area and larger volume as compared to a metal sample plate having a nonhydrophobic surface. Additionally, the hydrophobic surface greatly minimizes the spread of liquid across the surface, thus avoiding cross-contamination of analyte samples. However, the plate surface should not be so hydrophobic to cause the contact angle of the deposited liquid sample to be exceedingly high thereby reducing the footprint area of the deposited sample. Such area reduction is undesirable since the laser subsequently used to vaporize the sample has an increased probability of striking the sample plate rather than the sample during automated operation. This is undesirable particularly in tandem mass spectroscopy (MS/MS) processes, which require relatively large samples, which, in turn, require 10,000 to 100,000 or more exposures of the sample to the laser (shots).

It has been proposed in U.S. Pat. No. 6,287,872 to coat the sample plate (usually made of stainless steel) with a hydrophobic coating of a fluorinated polymer such as polytetrafluoroethylene (Teflon$^{R}$). While this coating provides a highly reproducible surface for sample and matrix depositions, such a polymer coating exhibits certain drawbacks. It has been found that the fluorinated polymer coating is evaporated essentially from the onset of exposing the samples to a laser thereby creating a neutral cloud, which in rapid fashion is deposited on the ion optical elements of the mass spectrometer used in the MALDI analysis. This contamination of the mass spectrometer causes it to become unstable, and constant retuning of instrument optics is required to maintain performance. Ultimately, such rapid coating of mass spectrometer ion optical elements, diminishes the effectiveness of the mass spectrometer to a level that performance can only be restored by cleaning the instrument. In addition, these coatings are relatively thick and therefore are not uniform. Furthermore, the fluorinated polymer coating is not removable from the sample plate under benign conditions so that it produces even more non-uniform results over repeated use in a MALDI process.

Hung et al., proposed (Anal. Chem., 1998, Vol. 70, N: 14, pp. 3088–3093) the use of a film of paraffin wax (referred to as Parafilm) applied over the metal probe to provide a hydrophobic surface for the sample probe tip. The Parafilm was first stretched to reduce its thickness and attached to the metal probe tip without using an adhesive to form a non-integral layer on the surface of the probe tip. As disclosed by Hung et al., a variation in peak position was observed from sample to sample, which could be caused by an uneven coating surface level. The non-uniformity is primarily due to the fact that the coating obtained with stretched Parafilm is too thick to permit control of surface uniformity, which is compounded by the non-integral attachment of the Parafilm. Providing a uniform sample surface is a key parameter allowing reliable reuse of the sample plate.

Accordingly, it would be desirable to provide a sample plate for use in a MALDI MS process, which has a uniform, easily removed hydrophobic surface that is reproducible from plate to plate. Such a sample plate would permit accurate positioning of samples on the plate in a repetitive manner so that the plate can be reused many times. Additionally, the coating would be stable, and not volatilized by the ionization process, thereby limiting its contribution to instrument contamination.

SUMMARY OF THE INVENTION

In accordance with one aspect of this invention, a MALDI sample plate is provided with an integral, hydrophobic coating of a substance such as synthetic waxes (e.g., paraffin waxes), natural waxes (e.g., bee's wax), lipids, esters, organic acids, silicon oils, or silica polymers. The foregoing substances are applied to the sample plate either as pure compounds or in mixtures with each other or as part of commercially available chemical compositions such as metal polishing paste or vegetable oils. In one embodiment the application of metal polish is effective for creating and restoring surface hydrophobicity of a sample plate.

The hydrophobic coating is a thin film (or mono layer) that has a thickness of between about 5 and about 50 nm that may be applied as part of a solution (liquid phase) or as a paste (solid phase). In one embodiment the coating is integrally formed on the plate by coating the plate with a solution or substance that contains the hydrophobic coating, and thereafter evaporating the solution solvent in which the coating was dissolved, thereby forming, reproducibly, a hydrophobic coating on the plate. The method of choice for preparing the sample plate is dependent upon the sample analysis application that is intended. For many samples, and for low volume spotting applications, a mildly hydrophobic surface as obtained from applying metal polish to a sample plate is optimal. For those applications that require >1 $\mu$l of sample to be deposited on the sample plate, coating the surface of the metal substrate with substances such as waxes (e.g., paraffin wax), lipids, esters, organic acids, silicon oils or silica polymers provide most reliable sample depositions.

The hydrophobic coated plate then is utilized to support samples to be analyzed by mass spectrometry, for example, in a MALDI process wherein the samples are exposed to multiple shots (e.g., 10,000 to 100,000 shots or more) of a laser. The sample plate then is removed from the MALDI apparatus, contacted with a solvent in which the coating is solublized to remove the coating and clean the plate of analyzed sample and matrix, dried and recoated with a fresh coating in the manner described above. The recoated sample plate has a uniform coating with substantially the same characteristics as the previous coating and thus, the plate can be reused in the MALDI apparatus to provide measurements, which are not skewed relative to previous or subsequent measurements.

BRIEF DESCRIPTION OF THE DRAWINGS

In FIG. 2A peptide concentration was 10 fmol and the sample plate was an uncoated stainless steel 2.25"×2.25" rectangular plate having a mirror finish. In FIG. 2B peptide concentration was 100 amol and the sample plate was a stainless steel 2.25"×2.25" rectangular plate having a mirror finish that was spray coated with 60 micrograms of paraffin in 50 microliter of hexane/heptane (50:50 v/v). The resultant surface was uniformly coated with paraffin, 20 nm thick.

In FIG. 3A the sample plate was an uncoated stainless steel 2.25"×2.25" rectangular plate having a mirror finish, and in FIG. 3B the sample plate was a stainless steel 2.25"×2.25" rectangular plate having a mirror finish that was spray coated with 60 micrograms of paraffin in 50 microliter of hexane/heptane (50:50 v/v). The resultant surface was uniformly coated with paraffin, 20 nm thick.

In FIG. 4A the sample plate was an uncoated stainless steel 2.25"×2.25" rectangular plate having a mirror finish, and in FIG. 4B the sample plate was a stainless steel 2.25"×2.25" rectangular plate having a mirror finish that was coated with metal polish.

In FIG. 5A the sample plate was an uncoated stainless steel 2.25"×2.25" rectangular plate having a mirror finish, and in FIG. 5B the sample plate was a stainless steel 2.25"×2.25" rectangular plate having a mirror finish that was coated with metal polish.

In FIG. 6A the sample plate was an uncoated stainless steel 2.25"×2.25" rectangular plate having a mirror finish, and in FIG. 6B the sample plate was a stainless steel 2.25"×2.25" rectangular plate having a mirror finish that was coated with a thin film of tripalmitin.

In FIG. 7A the sample plate was an uncoated stainless steel 2.25"×2.25" rectangular plate having a mirror finish and in FIG. 7B the sample plate was a stainless steel 2.25"×2.25" rectangular plate having a mirror finish that was coated with a thin film of tripalmitin.

DESCRIPTION OF SPECIFIC EMBODIMENTS

Figure 1:
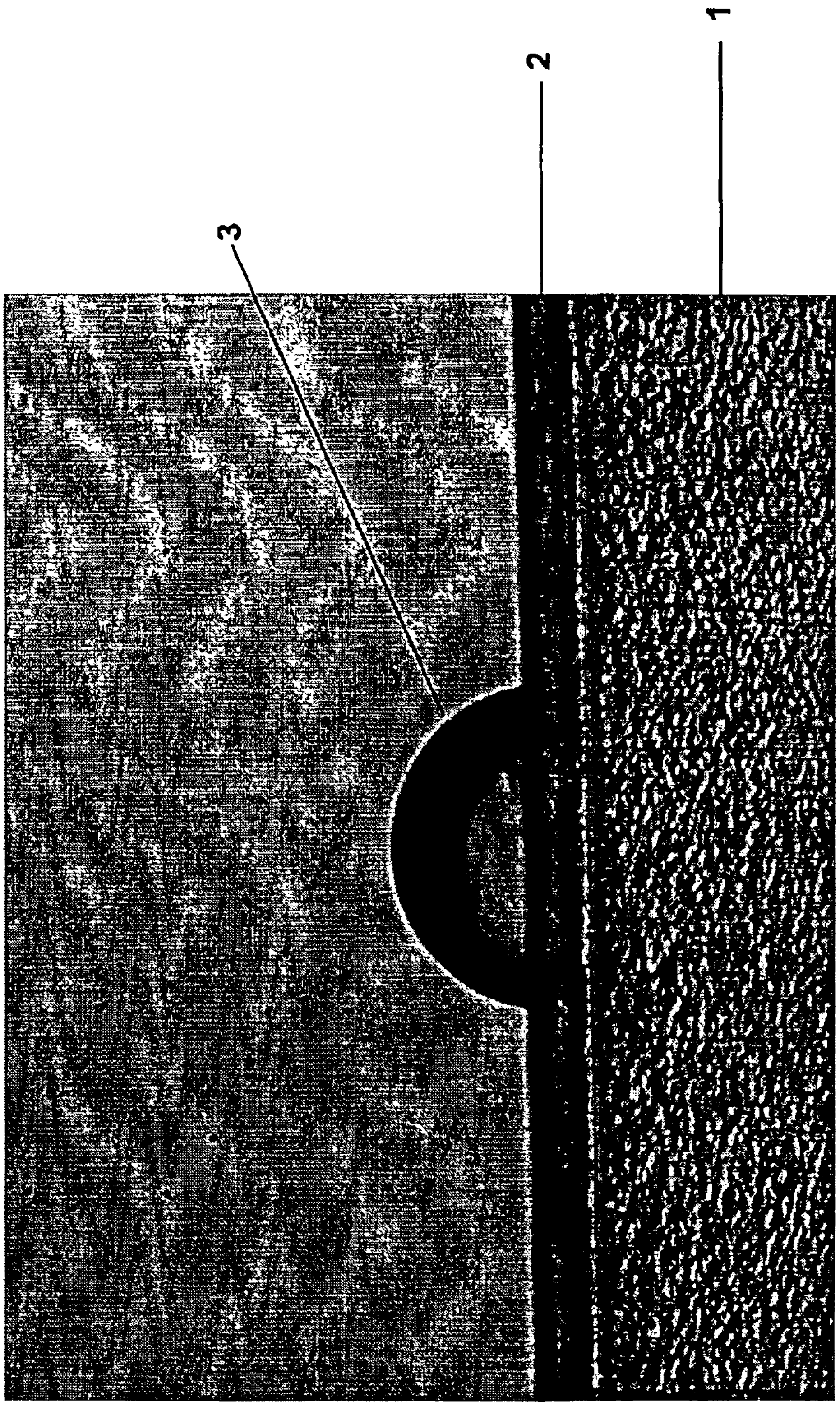
FIG. 1 is a partial cross-sectional view of a sample plate with a sample droplet deposited on a hydrophobic coated surface in accordance with one embodiment of this invention.

In accordance with one embodiment of this invention, a sample plate for a MALDI MS process is provided having an electrically conductive substrate integrally coated with a submicron thick layer of paraffin. By "integrally coated" (or "integrally bonded" or "integral") we mean a thin (sub micron thick) physical coating on a substrate created by the interaction of a variety of forces such as hydrophobic, ionic, van der Waals forces and the like that cannot be separated from or pulled off the substrate intact, rather the coating is removable by chemical treatment (e.g., by use of solvents) or mechanical (abrasive) treatment. A solution of paraffin is applied to a surface of the substrate such as a stainless steel sample plate by spraying, dipping or the like. The solution solvent is then evaporated under appropriate conditions to leave a thin uniform coating of paraffin integrally bonded to the surface.

In one embodiment of this invention, a sample plate for a MALDI MS process is provided having an electrically conductive substrate integrally coated with a submicron thick layer of a metal polish that has a composition that includes, for example, white spirits, kerosene (petroleum), coco fatty acid diethanol amide, aluminum oxide, ammonia solution and water. The sample plate is washed with a suitable surfactant (e.g., RBS-35 from Pierce), rinsed with water, and polished using a smear of the metal polish. The plate is polished to a shine and until no residue is deposited on a clean lint free tissue. Subsequently, the plate is rinsed with isopropanol, dried and is ready for use for sample deposition and MALDI MS analysis.

In one embodiment of this invention, a sample plate for a MALDI MS process is provided having an electrically conductive substrate integrally coated with a submicron thick layer of a lipid, such as mono-, di- and triglycerides, or an organic acid or an organic acid derivative that has specific functionality (such as a phosphate group or amine or amide group). The sample plate is washed with a suitable surfactant (e.g., RBS-35 from Pierce), rinsed with water, and is wiped with or dipped into a solution of the lipid that is in a suitable solvent, (e.g., alkane, alcohol or the like). The plate is polished to a shine until no haze or residue is observed on the plate, and is ready for use for sample deposition and MALDI MS analysis.

In one embodiment of this invention, a sample plate for a MALDI MS process is provided having an electrically conductive substrate integrally coated with a submicron thick layer of an organic acid that has a chain length of C2 to C30, and may possess a variety of functional groups (such as amine, alcohol, halogen groups or the like). The sample plate is washed with a suitable surfactant (e.g., RBS-35 from Pierce), rinsed with water, and is wiped with or dipped into a solution of the organic acid that is in a suitable solvent, (e.g. alkane, alcohol or the like). The plate is polished to a shine until no haze or residue is observed on the plate, and is ready for use for sample deposition and MALDI MS analysis.

In one embodiment of this invention, a sample plate for a MALDI MS process is provided having an electrically conductive substrate integrally coated with a submicron thick layer of an ester. Condensation products between organic acids of C2 to C30 chain lengths and alcohols of C2 to C30 or the like are esters that provide a hydrophobic surface for the MALDI plate of this invention. The sample plate is washed with a suitable surfactant (e.g., RBS-35 from Pierce), rinsed with water, and is wiped with or dipped into a solution of the lipid that is in a suitable solvent, (e.g., alkane, alcohol, or the like). The plate is polished to a shine until no haze or residue is observed on the plate, and is ready for use for sample deposition and MALDI MS analysis.

In one embodiment of this invention, a sample plate for a MALDI MS process is provided having an electrically conductive substrate integrally coated with a submicron thick layer of a silicon containing compound, such as silicon oil, vacuum grease or the like. The sample plate is washed with a suitable surfactant (e.g., RBS-35 from Pierce), rinsed with water, and is wiped with or dipped into a solution of the silicon containing compound that is in a suitable solvent, (e.g., hexane, isopropanol, etc.). A 1–10% solution of the silicon containing compound in a suitable solvent provides a hydrophobic surface for the sample plate of this invention. The plate is polished to a shine until no haze or residue is observed on the plate. Subsequently, the plate is rinsed with isopropanol, dried and is ready for use for sample deposition and MALDI MS analysis.

The conductivity of the thin film hydrophobic coating is sufficiently high to permit dissipation of surface charges and the avoidance of accumulated static charges in the surface. As a result, coated sample plates exhibit the same stability of signal versus the number of laser shots and the same resolution as is observed for standard untreated metal MALDI plates for both MS and MS/MS analytical processes. Because of the higher hydrophobicity of the coating as compared to the substrate surface, liquid handling is improved in that more liquid spots can be applied to the coated sample plate as compared to the number of spots that can be applied to the customary sample plate with its less hydrophobic substrate surface.

For best results, the coating applied should be a thin film, essentially a monolayer. When paraffin is used as the coating, a thickness in the range of between about 5 nm and 50 nm is preferred; when lipids are used, a thickness in the range of between about 5 nm and 50 nm is similarly preferred.

Representative suitable electrically conductive substrates upon which the hydrophobic coating is applied for the sample plate of this invention include stainless steel or other suitable metal substrates. In addition, plastics or other non-conductive materials, coated with a layer of metal to maintain electrical conductivity properties, can also be used.

Paraffin comprises a mixture of high molecular weight olefins and is usually obtained as a distillation fraction of petroleum. Any source of paraffin is useful in the present invention. The paraffin solution is formed by dissolving paraffin in a solvent such as hexane, heptane, octane, acetone or a mixture thereof at a temperature where paraffin dissolves while avoiding excessive solvent evaporation, e.g., between about 20° C. and about 30° C. Suitable concentrations of paraffin in solution to create the desired hydrophobic surface are between about 0.3 mg/ml and about 3 mg/ml, preferably between about 0.4 mg/ml and about 1.2 mg/ml. After application of the paraffin solution, the solvent on the plate is evaporated either at room temperature or at an elevated temperature, e.g., from about 20° C. to about 100° C. until the solvent is completely evaporated to leave a thin film of paraffin having a thickness between about 5 nm and about 50 nm, more preferably between about 5 nm and about 20 nm. When the substrate to be coated has a smooth mirror finish, the substrate surface is entirely and integrally coated with the paraffin. The resultant surface is hydrophobic and is capable of dissipating a static charge.

The degree of hydrophobicity is generally controlled by the concentration of the material applied and can be checked by measurement of the contact angle between the surface and a liquid composition (preferably water). FIG. 1 shows a metal substrate 1 coated with a layer of metal polish 2 upon which a sample droplet 3 has been deposited. The contact angle is about 90° which is preferred. Similar desired 90° contact angles are readily achievable with other hydrophobic coatings of the present invention (e.g., paraffin, lipids, organic acids, esters, silicon oils or silica polymers). The degree of hydrophobicity (and hence the contact angle) can vary over a wide range, however. A low contact angle (e.g., 45°) creates a greater footprint area of the deposited sample thereby reducing the number of spots that can be deposited on the plate which thus impacts throughput. On the other hand, too great a contact angle (e.g., 135°) can create artifacts such as irregular spot patterns (e.g., crescent shapes) that effect laser shot positioning and also increase chances of cross contamination. Those of skill in the art may, without undue experimentation, control surface hydrophobicity characteristics to produce desirable surface qualities for a given application.

After the paraffin-coated sample plate has been exposed to multiple laser shots in a MALDI process, it is processed so that it can be reused. The main portion of the matrix/analyte crystals can be easily washed with water and the remaining samples on the plate can be removed simultaneously with the coating itself in an aqueous solution such as by spraying or dipping with a solvent for paraffin such as an organic solvent of acetone, hexane or the like. The remaining sample will be carried from the plate with the dissolved paraffin.

The sample plate then can be recoated with paraffin in the manner described above. This process can be repeated 50–100 times or more without affecting the quality of the mass spectrometric measurements.

A sample plate having a hydrophobic coating may also be conveniently prepared using a commercially available metal polish such as sold under the brand name POL comprising constituents such as white spirits, kerosene (petroleum), coco fatty acid diethanol amide, aluminum oxide, ammonia solution and water. The sample plate is cleaned of previous samples and matrix by washing with a detergent (e.g., RBS-35 from Pierce) and by scrubbing using a toothbrush. The plate is rinsed with water and dried using lint free tissues. A minimum amount (e.g., an amount about the size of a pin head for a 2.25"×2.25" sample plate) of the metal polish is used to completely coat the whole surface of the plate. It is important to not let the polish dry, but to rub the plate with a lint free tissue until no black residues are observed on a clean lint free tissue that is rubbed across the plate. Subsequently, the plate is rinsed with isopropanol and dried by blowing air across the plate. If a haze is seen, the plate is polished with a clean lint-free tissue until a mirrored surface is restored. Surfaces of plates cleaned by this approach can be regenerated between 50 and 100 times or more without affecting the quality of the mass spectrometric measurements.

While not universally defined in the art, a lipid includes fatty acids and their derivatives, and substances related biosynthetically or functionally to these compounds. For example, compounds such as bile acids, tocopherols, phospholipids, mono-, di-, and triacylglycerols are all classified as lipids. Vegetable oils and animal fats may also be considered as lipid-rich mixtures that also are appropriate for use in the present invention. When a lipid or lipid mixture is used as the coating substance, the sample plate is cleaned of previous samples and matrix by washing with a detergent (e.g., RBS-35 from Pierce) and by scrubbing using a toothbrush. The plate is rinsed with water and dried using lint free tissues. The plate is next coated with a solution that contains the lipid that is dissolved in a suitable solvent (such as an alcohol, alkane or the like). Lipid concentrations of 5 to 50 mg/ml are convenient for generating a hydrophobic surface on a plate that is used for a MALDI MS process. In this process, the concentration of the lipid determines the hydrophobic character of the surface with higher lipid concentrations resulting in an increased hydrophobic character of the plate surface. For applications that require 1 $\mu$l or less spotting of analyte and matrix solutions, 10–20 mg/ml lipid concentrations are optimal. Coating the plate with a lipid or lipid mixture can be done by a variety of methods including dipping, spraying, or wiping the solution across the plate. In the latter approach the solvent is not allowed to dry, instead the plate is wiped with a lint free tissue until no solvent or haze is observed to dry the plate. Subsequently, the plate is rinsed with isopropanol and dried by blowing air across the plate. If a haze is seen, the plate is polished with a clean lint-free tissue until a mirrored surface is restored. Surfaces of plates cleaned by this approach can be regenerated between 50 and 100 times or more without affecting the quality of the mass spectrometric measurements.

The use of an organic acid such as a carboxylic acid with a chain length of two or more carbons (C2), but preferably less than thirty carbons (C30) is contemplated for use in the present invention. The organic acid may also possess a variety of functional groups (such as amines, alcohols, halogens or the like). The sample plate is cleaned of previous samples and matrix by washing with a detergent (e.g., RBS-35 from Pierce) and by scrubbing using a toothbrush. The plate is rinsed with water and dried using lint free tissues. The plate is next coated with a solution that contains the organic acid that is dissolved in a suitable solvent (such as an alcohol, alkane or the like). Organic acid concentrations of 5 to 50 mg/ml are convenient for generating a hydrophobic surface on a plate that is used for a MALDI MS process. In this process, the concentration and chain length of the organic acid determines the hydrophobic character of the surface with higher organic acid concentrations, and longer chain lengths, resulting in an increased hydrophobic character of the plate surface. For applications that require 1 $\mu$l or less spotting of analyte and matrix solutions, 10–20 mg/ml organic acid concentrations are optimal. Coating the plate with the organic acid can be done by a variety of methods including dipping, spraying, or wiping the solution across the plate. In the latter approach the solvent is not allowed to dry, instead the plate is wiped with lint free tissue until no solvent or haze is observed to dry the plate. Subsequently, the plate is rinsed with isopropanol and dried by blowing air across the plate. If a haze is seen, the plate is polished with a clean lint-free tissue until a mirrored surface is restored. Surfaces of plates cleaned by this approach can be regenerated between 50 and 100 times or more without affecting the quality of the mass spectrometric measurements.

Silicon containing compounds, including silicon oils, vacuum grease, silica polymers and the like, also provide a useful hydrophobic surface for the sample plate of this invention. The sample plate is cleaned of previous samples and matrix by washing with a detergent (e.g., RBS-35 from Pierce) and by scrubbing using a toothbrush. The sample plate is also washed with a solvent in which the silicon-containing compound completely dissolves. The plate is then dried using lint free tissues and is subsequently coated with a solution that contains the silicon-containing compound. A 1–10% solution of the silicon-containing compound in a suitable solvent provides a useful hydrophobic surface for the sample plate of this invention. Coating the plate with the organic acid can be done by a variety of methods including dipping, spraying, or wiping the solution across the plate. In the latter approach the solvent is not allowed to dry, instead the plate is wiped with lint free tissue until no solvent or haze is observed to dry the plate. Subsequently, the plate is rinsed with isopropanol and dried by blowing air across the plate. If a haze is seen, the sample plate is polished with a clean lint-free tissue until a mirrored surface is restored. Surfaces of plates cleaned by this approach can be regenerated between 50 and 100 times or more without affecting the quality of the mass spectrometric measurements.

The foregoing description as well as the examples given below describe the substances which form the hydrophobic coating used in the present invention (e.g., synthetic waxes such as paraffin wax, natural waxes such as bee's wax, lipids, esters, organic acids, silicon oils or silica polymers) in the context of pure compounds. Equally contemplated as providing appropriate coating in the context of the present invention are mixtures of each of the foregoing substances, including mixtures with each other or as components of commercially available chemical compositions such as polishing paste and vegetable oils. All that is required is that the concentration of the substance creating the hydrophobic surface be sufficient to produce the desired surface qualities.

The following examples illustrate the present invention and are not intended to limit the same.

EXAMPLE 1

A MALDI stainless steel 2.25"×2.25" rectangular plate having a mirror finish was sprayed with 60 micrograms of paraffin in 50 microliter of hexane/heptane (50:50 v/v). The resultant surface was uniformly coated with paraffin, 20 nm thick.

A sample of 1 μl mixture containing 100 amols of des-Arg$^1$-Bradykinin, Angiotensin I, Glu$^1$-Fibrinopeptide, and various ACTH clips: 1–17, 18–39 and 7–38 in 50% acetonitrile/water (v/v) with 0.1% TFA and 5 mg/ml alpha cyano-4-hydroxy cinnamic acid was deposited on the coated surface to produce a droplet having a contact angle of about 90°.

The sample plate then was inserted into a Voyager MALDI apparatus available from Applied Biosystems, Framingham, Mass. and this sample was analyzed by a MALDI-TOF process. This analysis was compared to an analysis of the same aqueous sample deposited on an uncoated stainless steel sample plate of the same dimension as set forth above and having a mirror finish.

Figure 2A:
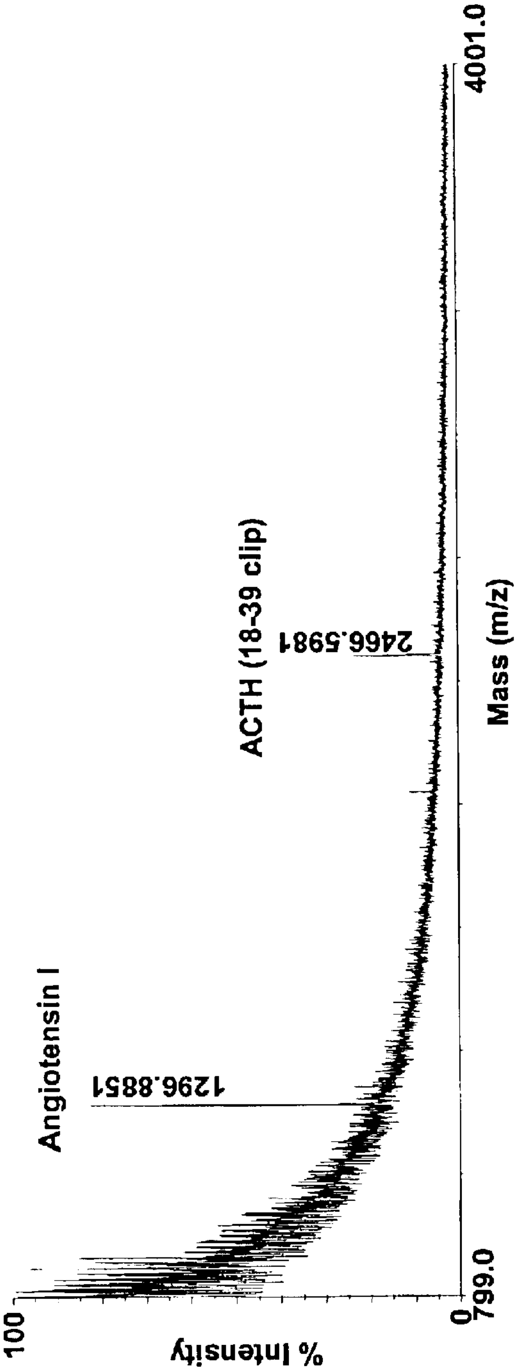
FIGS. 2A and 2B depict MALDI mass spectra collected by analysis of 1 $\mu$l of a mixture containing des-Arg$^1$-Bradykinin, Angiotensin I, Glu$^1$-Fibrinopeptide, and various ACTH clips: 1–17, 18–39 and 7–38 in 50% acetonitrile/water (v/v) with 0.1% TFA and 5 mg/ml alpha cyano-4-hydroxy cinnamic acid.
Figure 2B:
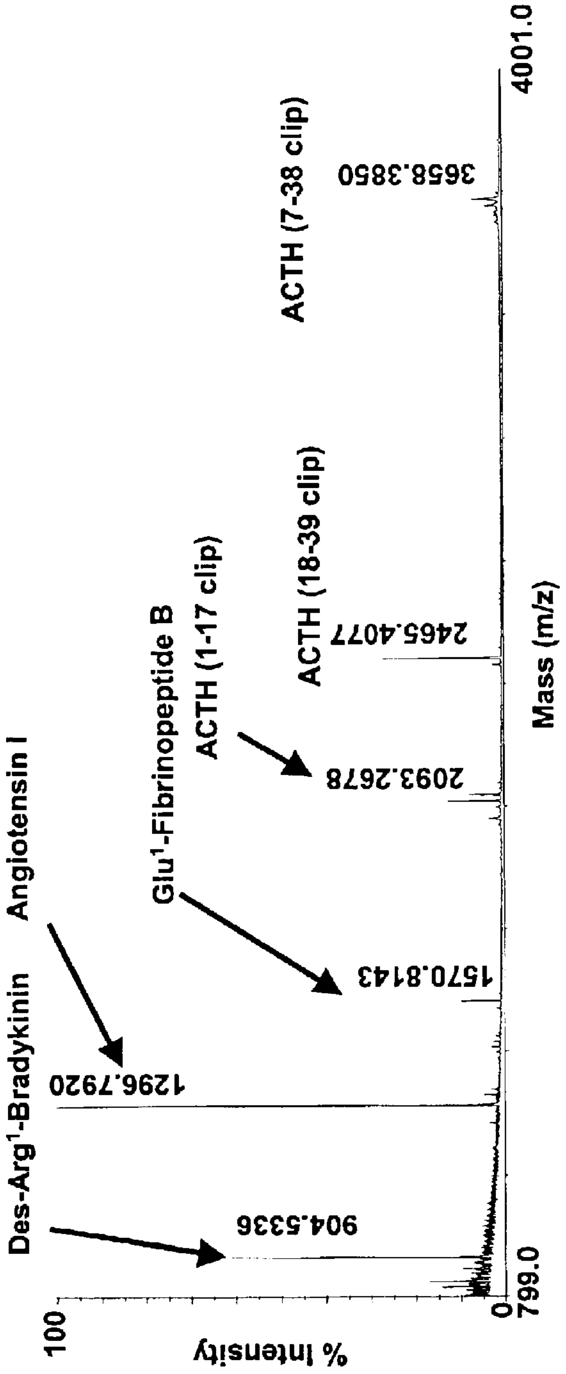

The resultant analysis with the uncoated plate is shown in FIG. 2A. The resultant analysis with the coated plate is shown in FIG. 2B. As shown in FIGS. 2A and 2B, the overall sensitivity is much better with hydrophobic coating.

EXAMPLE 2

A MALDI stainless steel 2.25"×2.25" rectangular plate having a mirror finish was sprayed with 60 micrograms of paraffin in 50 microliter of hexane/heptane (50:50 v/v) minutes. The resultant surface was uniformly coated with paraffin, 10 nm thick.

A sample of 1 μl mixture containing 100 fmols of trypic digest of β-galactosidase in 50% acetonitrile/water (v/v) with 0.1% TFA was deposited on the coated surface to produce a droplet having a contact angle of about 90°.

The sample plate then was inserted into an Applied Biosystems 4700 Proteomics Analyzer available from Applied Biosystems, Framingham, Mass., and this sample was analyzed by a MALDI-MS/MS process for the parent ion of selected digestion fragment (1394 Da). This analysis was compared to an analysis of the same aqueous sample deposited on an uncoated stainless steel sample plate of the same dimension as set forth above and having a mirror finish.

Figure 3A:
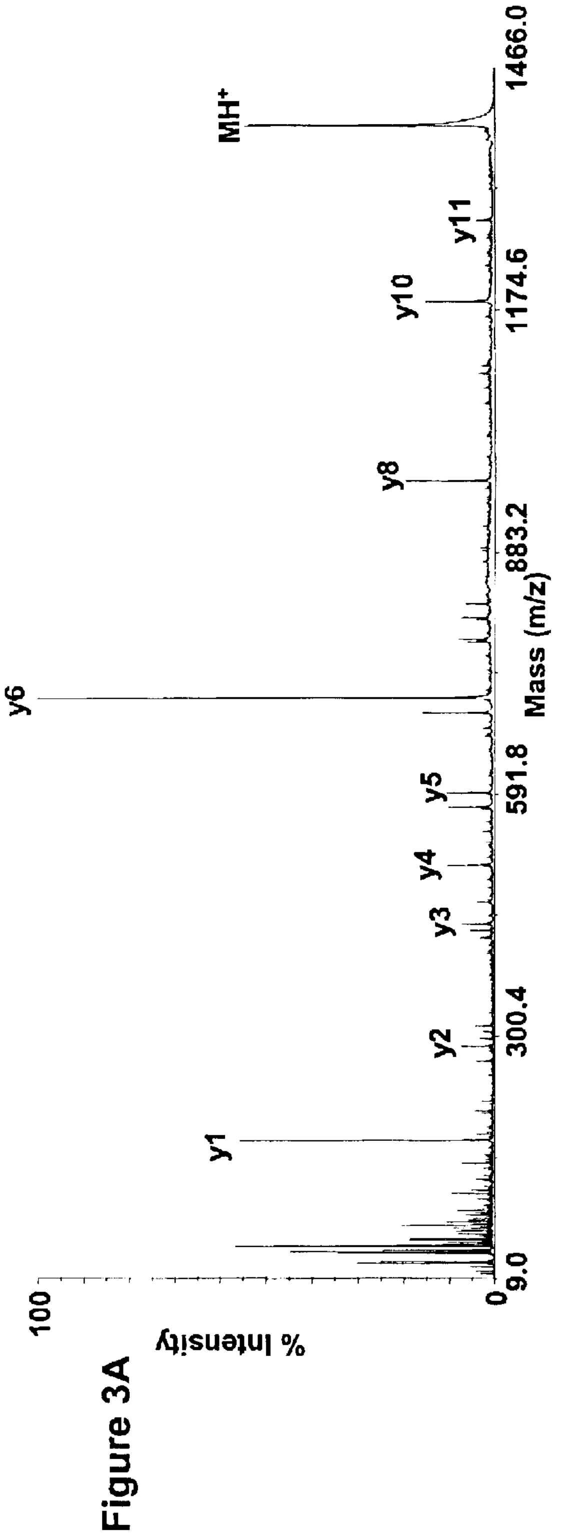
FIGS. 3A and 3B are MALDI tandem MS (MS/MS) spectra of 100 fmols of trypic digest of β-galactosidase in 50% acetonitrile/water (v/v) with 0.1% TFA with 5 mg/ml alpha cyano-4-hydroxy cinnamic acid, collected for the fragmented precursor ion of 1394 Da. Labels identify C-terminal fragment ions.
Figure 3B:
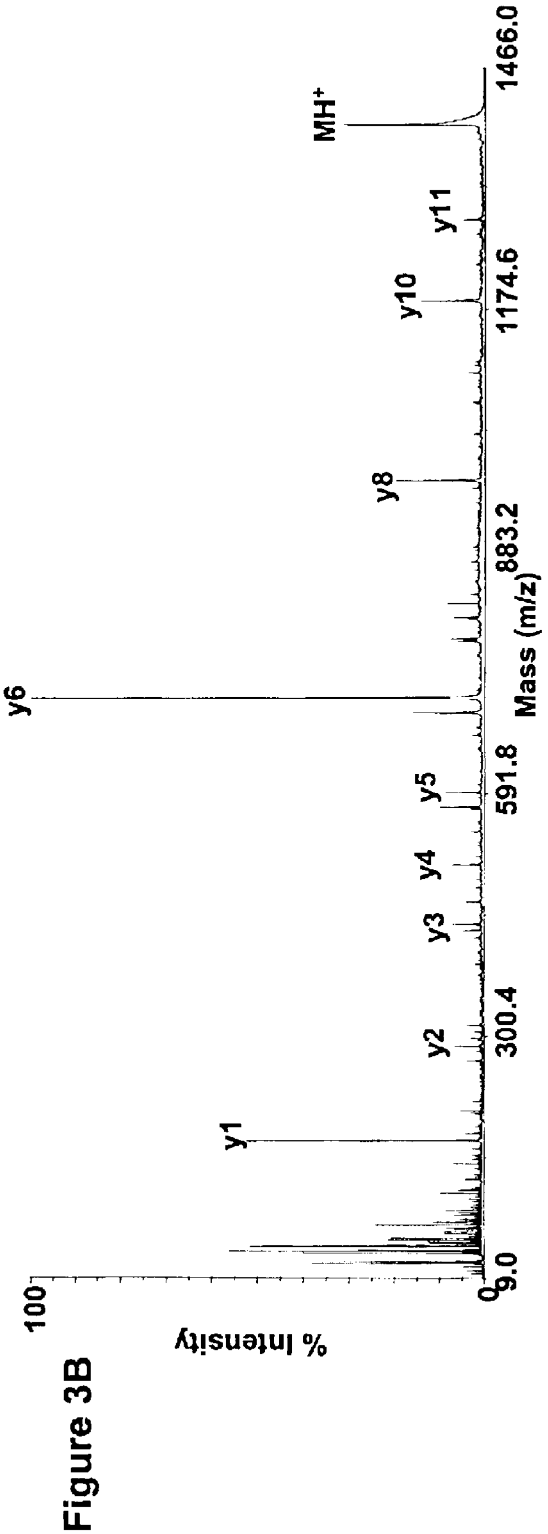

The resultant analysis with the uncoated plate is shown in FIG. 3A. The resultant analysis with the coated plate is shown in FIG. 3B. As shown in FIGS. 3A and 3B, the hydrophobic coating did not have any adverse effect on the resolution or the sensitivity of the MS/MS spectra, which will be normally observed with Teflon$^R$ coated plates.

EXAMPLE 3

A MALDI stainless steel 2.25"×2.25" rectangular plate having a mirror finish was prepared by scrubbing the plate with a 10% solution of RBS-35 in water, rinsing with water and drying with lint free tissue. The plate was polished with a minimum amount (bead the size of a pin head) metal polish that was comprised of white spirits, kerosene (petroleum), coco fatty acid diethanol amide, aluminum oxide, ammonia solution and water. On complete removal of the haze and when no black residue was detected on a clean lint free tissue the plate was washed with isopropanol and dried by blowing air across the plate.

A sample of 10 fmol of des-Arg$^1$-Bradykinin, Angiotensin I, Glu$^1$-Fibrinopeptide, and various ACTH clips: 1–17, 18–39 and 7–38 in 50% acetonitrile/water (v/v) with 0.1% TFA and 5 mg/ml alpha cyano-4-hydroxy cinnamic acid was deposited on the polished surface to produce a droplet having a contact angle of about 90°.

The sample plate then was inserted into an Applied Biosystems 4700 Proteomics Analyzer available from Applied Biosystems, Framingham, Mass. This sample was analyzed by a MALDI-MS process. The data collected by this analysis was compared to an analysis of the same aqueous sample deposited on an uncoated stainless steel sample plate of the same dimension as set forth above and having a mirror finish.

Figure 4A:
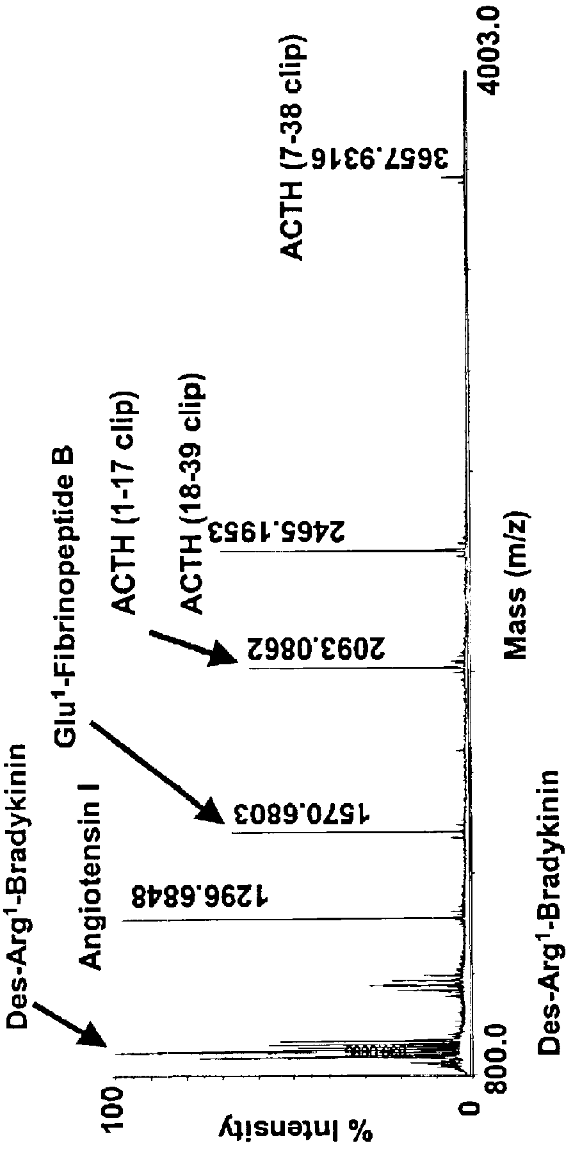
FIGS. 4A and 4B depict MALDI mass spectra collected by analysis of 0.7 $\mu$l of a mixture containing 10 fmol of des-Arg$^1$-Bradykinin, Angiotensin I, Glu$^1$-Fibrinopeptide, and various ACTH clips: 1–17, 18–39 and 7–38 in 50% acetonitrile/water (v/v) with 0.1% TFA and 5 mg/ml alpha cyano-4-hydroxy cinnamic acid.
Figure 4B:
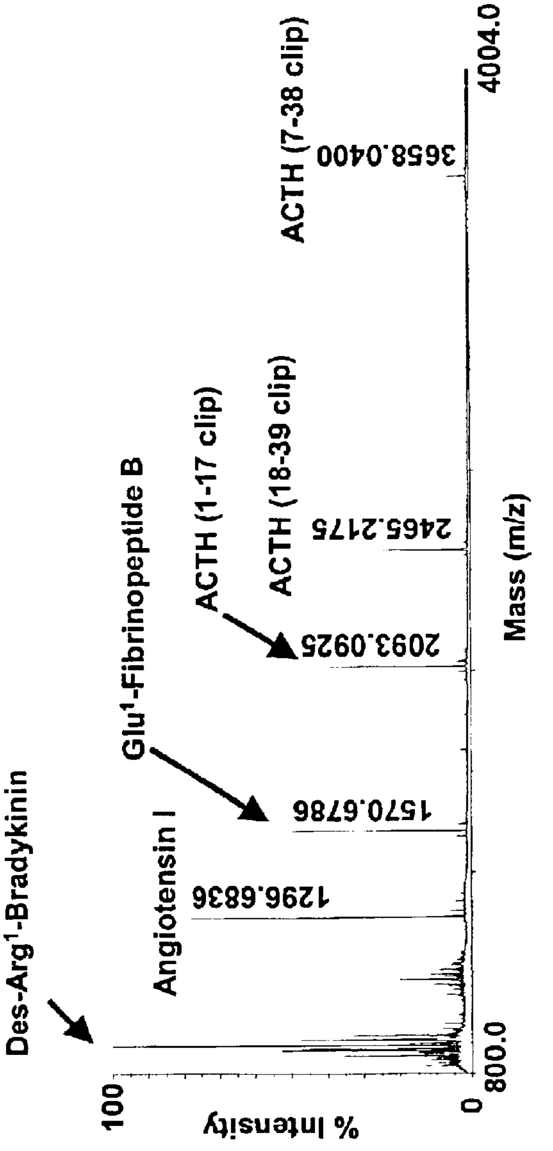

The resultant analysis with the uncoated plate is shown in FIG. 4A. The resultant analysis with the coated plate is shown in FIG. 4B. As shown in FIGS. 4A and 4B, the polished sample plate did not have any adverse effect on the resolution or mass accuracy of the measurement and exhibited equivalent or better performance. There was also no detectable increase in chemical background noise from the polished plate.

EXAMPLE 4

A MALDI stainless steel 2.25"×2.25" rectangular plate having a mirror finish was prepared by scrubbing the plate with a 10% solution of RBS-35 in water, rinsing with water and drying with lint free tissue. The plate was polished with a minimum amount (bead the size of a pin head) metal polish that was comprised of white spirits, kerosene (petroleum), coco fatty acid diethanol amide, aluminum oxide, ammonia solution and water. On complete removal of the haze and when no black residue was detected on a clean lint free tissue the plate was washed with isopropanol and dried by blowing air across the plate.

A sample of 0.7 $\mu$l mixture containing 100 fmols of a trypic digest of β-galactosidase in 50% acetonitrile/water (v/v) with 0.1% TFA and 5 mg/ml alpha cyano-4-hydroxy cinnamic acid was deposited on the polished surface to produce a droplet having a contact angle of about 90°.

The sample plate then was inserted into an Applied Biosystems 4700 Proteomics Analyzer available from Applied Biosystems, Framingham, Mass. The sample was analyzed by a MALDI-MS/MS process for the selected trypsin digestion fragment of precursor mass 1394 Da. This analysis was compared to an analysis of the same aqueous sample deposited on an uncoated stainless steel sample plate of the same dimension as set forth above and having a mirror finish.

Figure 5A:
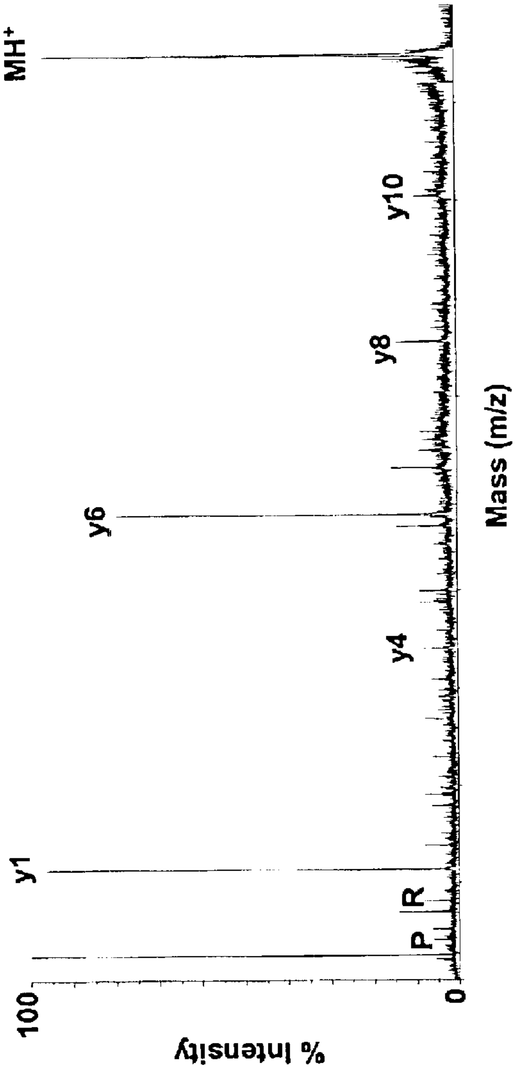
FIGS. 5A and 5B are MALDI MS/MS spectra of 100 fmols of trypic digest of β-galactosidase in 50% acetonitrile/water (v/v) with 0.1% TFA with 5 mg/ml alpha cyano-4-hydroxy cinnamic acid, collected for the fragmented precursor ion of 1394 Da. Labels identify C-terminal fragment ions.
Figure 5B:
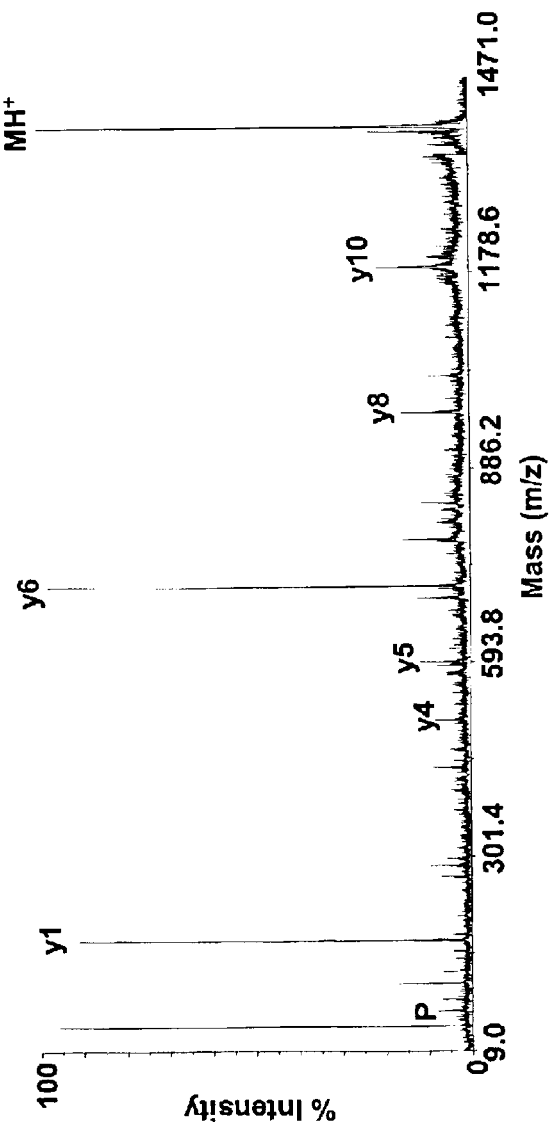

The resultant analysis with the uncoated plate is shown in FIG. 5A. The resultant analysis with the coated plate is shown in FIG. 5B. As shown in FIGS. 5A and 5B, the polished sample plate did not have any adverse effect on the resolution or mass accuracy of the measurement. There was also no detectable increase in chemical background noise in the polished plate, and the MS/MS spectra collected from both uncoated and polished plates were essentially equivalent with no loss of resolution, signal intensity or mass accuracy detectable in the data collected from the polished plate and in some instances exhibited better performance.

EXAMPLE 5

A MALDI stainless steel 2.25"×2.25" rectangular plate having a mirror finish was prepared by scrubbing the plate with a 10% solution of RBS-35 in water, rinsing with water and drying with lint free tissue. The plate was wiped with a 10 mg/ml solution of tripalmitin in isopropanol. The isopropanol was allowed to evaporate and the plate was given a final polish to remove any visible haze prior to sample deposition.

A sample of 10 fmol of des-$Arg^1$-Bradykinin, Angiotensin I, $Glu^1$-Fibrinopeptide, and various ACTH clips: 1–17, 18–39 and 7–38 in 50% acetonitrile/water (v/v) with 0.1% TFA and 5 mg/ml alpha cyano-4-hydroxy cinnamic acid was deposited on the polished surface to produce a droplet having a contact angle of about 90°.

The sample plate then was inserted into an Applied Biosystems 4700 Proteomics Analyzer available from Applied Biosystems, Framingham, Mass., and this sample was analyzed by a MALDI-MS process. The data collected by this analysis was compared to an analysis of the same aqueous sample deposited on an uncoated stainless steel sample plate of the same dimension as set forth above and having a mirror finish.

Figure 6A:
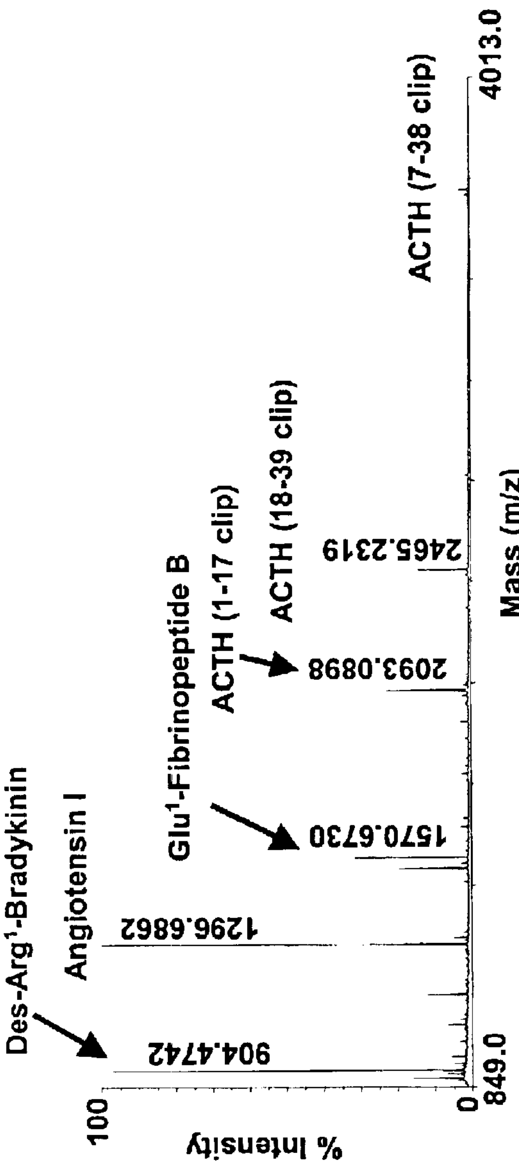
FIGS. 6A and 6B depict MALDI mass spectra collected by analysis of 0.7 $\mu$l of a mixture containing 10 fmol of des-Arg[1]-Bradykinin, Angiotensin I, Glu[1]-Fibrinopeptide, and various ACTH clips: 1–17, 18–39 and 7–38 in 50% acetonitrile/water (v/v) with 0.1% TFA and 5 mg/mL alpha cyano-4-hydroxy cinnamic acid.
Figure 6B:
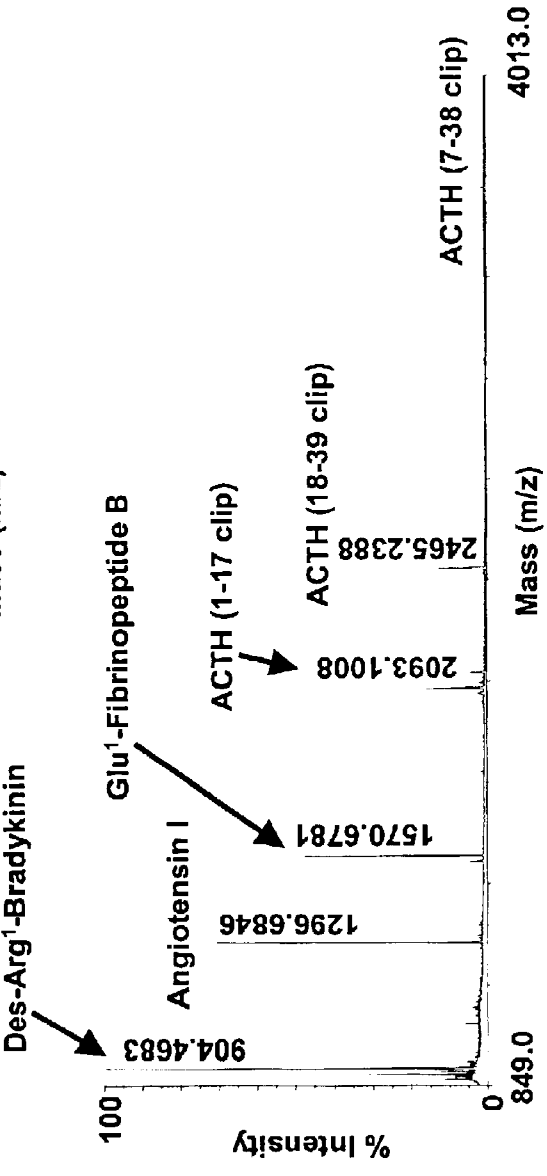

The resultant analysis with the uncoated plate is shown in FIG. 6A. The resultant analysis with the lipid-coated plate is shown in FIG. 6B. As shown in FIGS. 6A and 6B, the polished sample plate did not have any adverse effect on the resolution or mass accuracy of the measurement and exhibited equivalent or better performance. There was also no detectable increase in chemical background noise in the lipid-coated plate.

EXAMPLE 6

A MALDI stainless steel 2.25"×2.25" rectangular plate having a mirror finish was prepared by scrubbing the plate with a 10% solution of RBS-35 in water, rinsing with water and drying with lint free tissue. The plate was wiped with a 10 mg/ml solution of tripalmitin in isopropanol. The isopropanol was allowed to evaporate and the plate was given a final polish to remove any visible haze prior to sample deposition.

A sample of 1 $\mu$l mixture containing 100 fmols of a trypic digest of β-galactosidase in 50% acetonitrile/water (v/v) with 0.1% TFA and 5 mg/ml alpha cyano-4-hydroxy cinnamic acid was deposited on the polished surface to produce a droplet having a contact angle of about 90°.

The sample plate then was inserted into an Applied Biosystems 4700 Proteomics Analyzer available from Applied Biosystems, Framingham, Mass. The sample was analyzed by a MALDI-MS/MS process for the selected trypsin digestion fragment of precursor mass 1394 Da. This analysis was compared to an analysis of the same aqueous sample deposited on an uncoated stainless steel sample plate of the same dimension as set forth above and having a mirror finish.

Figure 7A:
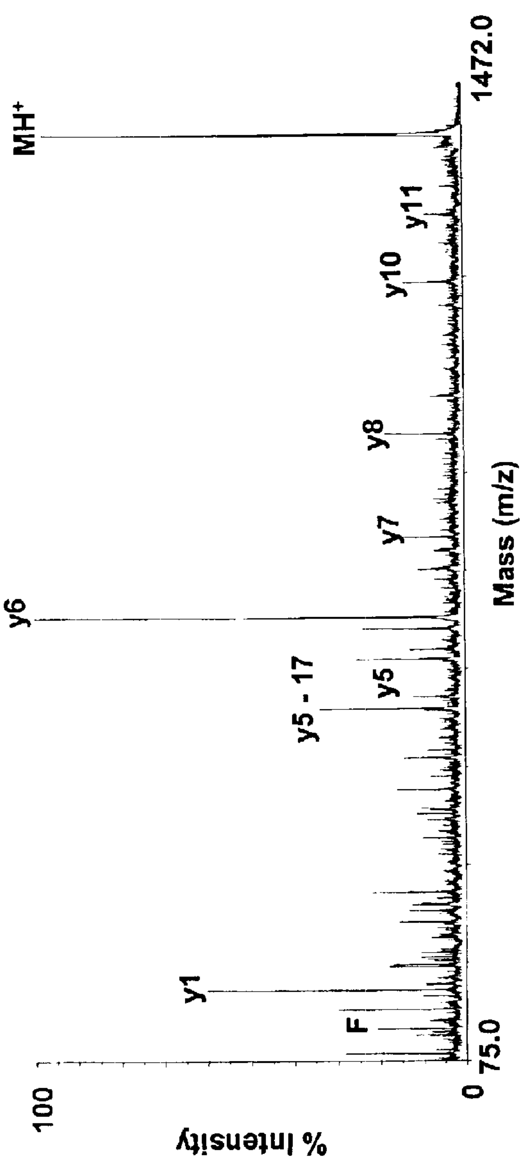
FIGS. 7A and 7B are MALDI MS/MS spectra of 100 fmols of trypic digest of β-galactosidase in 50% acetonitrile/water (v/v) with 0.1% TFA with 5 mg/ml alpha cyano-4-hydroxy cinnamic acid, collected for the fragmented precursor ion of 1394 Da. Labels identify C-terminal fragment ions.
Figure 7B:
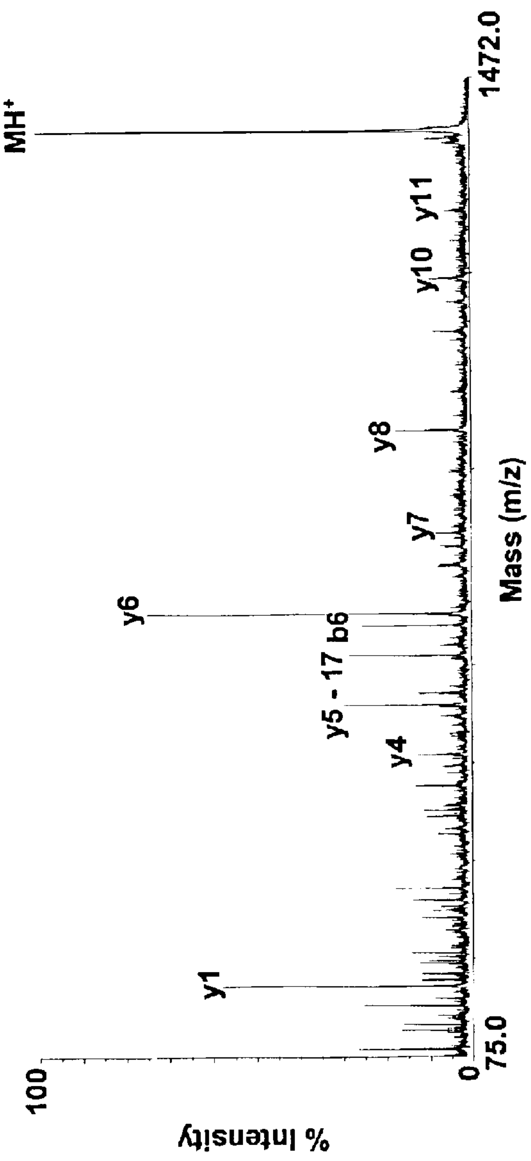

The resultant analysis with the uncoated plate is shown in FIG. 7A. The resultant analysis with the coated plate is shown in FIG. 7B. As shown in FIGS. 7A and 7B, the polished sample plate did not have any adverse effect on the resolution or mass accuracy of the measurement. There was also no detectable increase in chemical background noise from the lipid coated plate, and the MS/MS spectra collected from both uncoated and lipid-coated plates were essentially equivalent with no loss of resolution, signal intensity or mass accuracy detectable in the data collected from the polished plate and in some instances exhibited better performance.

What is claimed is:

1. A MALDI sample plate comprising an electrically conductive substrate having a surface at least a portion of which is substantially uniformly coated with a thin film of a hydrophobic coating comprising at least one of a synthetic wax, natural wax, lipid, hydrophobic organic acid, hydrophobic ester, silicon oil, or silica polymers or mixtures of the foregoing substances either with each other or as components of chemical compositions;

wherein the thin film comprises a monolayer of the hydrophobic coating non-covalently bound to the surface; and wherein the thin film can be removed from the substrate only by chemical or abrasive treatment.

2. The sample plate of claim 1 wherein the synthetic wax hydrophobic coating comprises paraffin.

3. The sample plate of claim 1 wherein the lipid hydrophobic coating comprises tripalmitin.

4. The sample plate of claim 1 wherein the hydrophobic coating comprises a polish comprising mixtures of compositions designed to clean and protect metal surfaces.

5. The sample plate of claims 2, 3 or 4 wherein the hydrophobic coating has a thickness between about 5 nm and about 50 nm.

6. The sample plate of claims 2, 3 or 4 wherein the hydrophobic coating has a thickness of between about 5 nm and 20 nm.

7. A MALDI sample plate comprising an electrically conductive substrate having a first surface, at least a portion of the first surface being uniformly and integrally coated with a hydrophobic coating having a thickness between about 5 nm and 50 nm wherein the hydrophobic coating can be removed only by chemical or abrasive treatment.

8. The sample plate of claim 7 wherein the coating thickness is between about 5 nm and 20 nm.

9. The sample plate of claim 7 or 8 wherein the hydrophobic coating comprises paraffin.

10. The sample plate of claim 7 or 8 wherein the hydrophobic coating comprises a lipid.

11. The sample plate of claim 7 or 8 wherein the hydrophobic coating comprises a polish comprising mixtures of compositions designed to clean and protect metal surfaces.

12. A method of making a MALDI sample plate comprising the step of coating a surface of an electrically conductive substrate with a thin film of a hydrophobic material comprising at least one of a synthetic wax, natural wax, lipid, hydrophobic organic acid, hydrophobic ester, silicon oil, or silica polymers or mixtures of the foregoing substances either with each other or as components of chemical compositions;

wherein the thin film comprises a monolayer non-covalently bound to the surface; and wherein the thin film can be removed from the substrate only by chemical or abrasive treatment.

13. The method of claim 12 wherein the coating of hydrophobic material comprises an integral, uniform monolayer.

14. The method of claim 12 wherein the monolayer has a thickness between about 5 nm and 50 nm.

15. The method of claim 12 wherein the monolayer has a thickness between about 5 nm and 20 nm.

16. The method of claim 12 wherein the synthetic wax hydrophobic coating comprises paraffin.

17. The method of claim 12 wherein the lipid hydrophobic coating comprises tripalmitin.

18. The method of claim 12 wherein the hydrophobic coating comprises a polish comprising mixtures of compositions designed to clean and protect metal surfaces.

19. A method of analyzing a plurality of analyte samples by MALDI process, which comprises:

providing a MALDI sample plate comprising an electrically conductive substrate having a surface at least a portion of which is substantially uniformly coated with a thin film of a hydrophobic coating comprising at least one of a synthetic wax, natural wax, lipid, hydrophobic organic acid, hydrophobic ester, silicon oil, or silica polymers or mixtures of the foregoing substances either with each other or as components of chemical compositions;

wherein the thin film comprises a monolayer of the hydrophobic coating non-covalently bound to the surface, and wherein the thin film can be removed from the substrate only by chemical or abrasive treatment;

depositing a plurality of liquid analyte samples on the MALDI sample plate, analyzing the sample by a MALDI process, chemically or abrasively removing the thin film from the electrically conductive substrate, and re-forming the thin film on the surface of the electrically conductive substrate.

* * * * *